Dec. 1, 1936.  F. KINDBERG  2,062,752
ELECTRIC CONDUIT
Filed Sept. 5, 1935
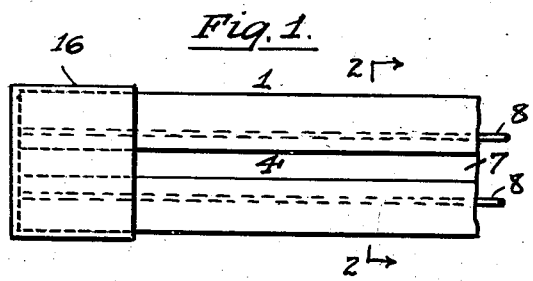
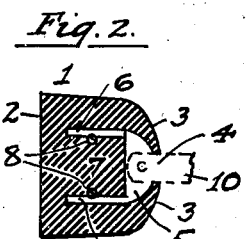
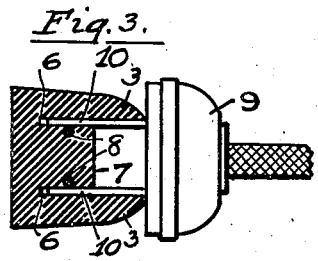
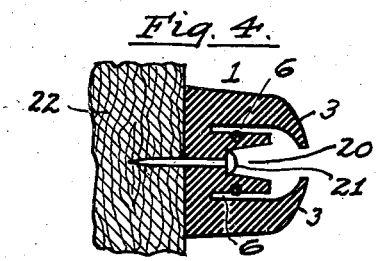
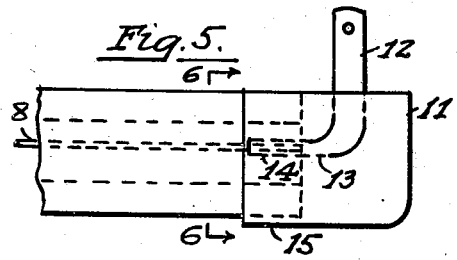
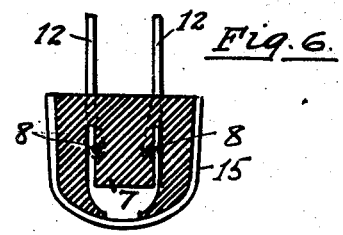
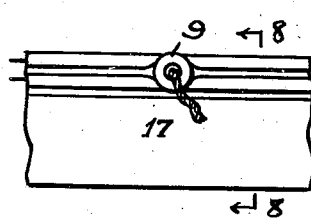
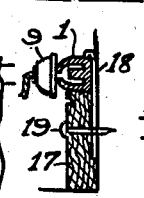
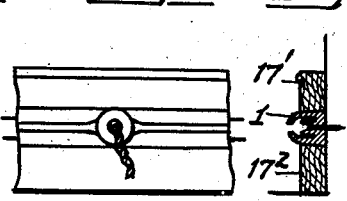
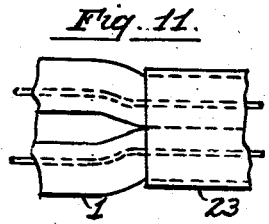
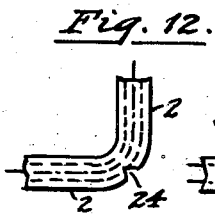
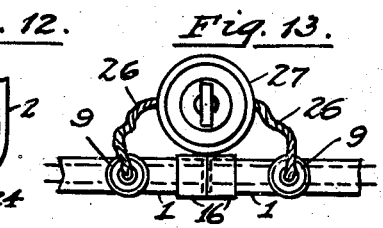
INVENTOR:-
Frank Kindberg.

Patented Dec. 1, 1936

2,062,752

UNITED STATES PATENT OFFICE 2,062,752

ELECTRIC CONDUIT

Frank Kindberg, Detroit, Mich.

Application September 5, 1935, Serial No. 39,297

1 Claim. (Cl. 247—3)

My invention relates to electric conduits, and its principal object is to provide a conduit having two or more conductors arranged in parallel spaced relation throughout its entire length, and so arranged that one or more connections may be tapped into the said conductors at any desired points along the conduit.

Another object of my said invention is to provide a conduit of the character described which may be easily and quickly applied to a wall or other support and which may be connected to any type of existing outlet without any particular skill on the part of the operator.

A further object of my said invention is to provide a conduit which is simple in construction and economical to manufacture, and which may be made in any desired lengths and bent around corners, and otherwise disposed of so as to meet any existing conditions.

With these and other objects in view I will now describe a preferred embodiment of my said invention with reference to the accompanying drawing in which—

Figure 1 is a front elevation showing a portion of my improved conduit.

Figure 2 is a transverse section on line 2—2 of Figure 1 showing the conduit in its normal condition.

Figure 3 is a similar section of the conduit showing a standard connecting plug inserted therein.

Figure 4 is a section similar to Figure 2 illustrating a modified construction.

Figure 5 is a fragmentary plan view showing the conduit provided with a terminal connection which is adapted to take current from any existing outlet.

Figure 6 is a section on line 6—6 of Figure 5.

Figure 7 is an elevation drawn to a reduced scale showing one method of connecting my improved conduit to a baseboard, and Figure 8 is a section on line 8—8 of Figure 7.

Figures 9 and 10 are views corresponding to Figures 7 and 8, respectively, showing modifications to be hereinafter described.

Figure 11 is a fragmentary, full-sized elevation showing my improved conduit as used in connection with a tubular casing as required for passing through a wall and in similar conditions.

Figure 12 is a view drawn to a reduced scale showing my improved conduit as used in turning a corner.

Figure 13 is a small scale view showing two adjoining sections of the conduit with a switch arranged therebetween.

Like characters designate corresponding parts throughout the several views.

1 is the conduit, made from rubber or other resilient insulating material, having a flat rear surface 2 and a normally arcuate front surface comprising two flanges 3 arranged in opposed relation and having therebetween a slot 4. Communicating with the slot 4 is a longitudinal chamber 5 and a pair of parallel grooves 6 spaced apart as shown more clearly in Figure 2, there being between the slots a continuous, solid, rectangular portion 7 in which are embedded two or more conductor wires 8 in such manner that portions of the said wires project outwards into the slot 6.

The slot 4 is of such width as to permit the entrance of the prongs 10 of a standard connecting plug 9, as shown in Figure 3, when the said prongs are disposed crosswise as indicated in Figure 2. When it is desired to insert a plug at any point in the conduit, the prongs are first inserted in the slot 4 in the manner shown in Figure 2 and the plug is then rotated through ninety degrees, during which movement the flanges 3 are forced outwards into the position shown in Figure 3, when further pressure upon the plug will cause the prongs 10 to enter the slots 6 and make contact with the conductor wires 8. Thus a perfect connection is made between the plug and the conductor wires, and the prongs are firmly maintained in position by the resilient frictional contact between the flanges 3 and the outer surfaces of the prongs. In this manner any number of plugs may be connected to the conduit. It is well known that in the majority of old buildings, and more especially in private homes, the number of outlets in the electric system is so small that it is impossible to accommodate all of the modern electrical appliances now in use, such as floor lamps, radios, vacuum cleaners, toasters, etc., so that the supplying of current to all of these appliances is a matter of great difficulty and inconvenience. According to the present invention a section of conduit may be connected to a single outlet in a room and extended therearound to carry current to any desired point.

In Figures 5 and 6 is shown a terminal connection for the conduit which comprises a block 11 of insulating material provided with a pair of prongs 12 adapted to enter any of the usual wall plugs, the prongs extending inwards through the block and being bent around at right angles at 13, terminating in sockets 14 in which the end of the conductors 8 are soldered or otherwise secured. The block 11 is provided with flanges 15 extending around the front and sides of the conduit, the said flanges being attached to the body of the conduit by cementation or other means. The free end of the conduit may be protected by a cap 16 of rubber, fiber or other material, as shown in Figure 1.

In Figures 7 and 8 the conduit 1 is shown superposed upon a baseboard or plinth 17, being held in contact therewith by a hooked member 18 which engages the upper surface of the conduit and is secured to the back of the board 17 by screws as 19, or other means.

In Figure 4 is shown a modified construction of the conduit in which is provided, centrally of the portion 7, a continuous groove 20 adapted to receive nails 21, tacks, or other means by which the conduit is secured at suitable intervals to a wall 22 or other support. Figures 9 and 10 show this type of conduit located between a pair of half baseboards 171, 172, which forms a very convenient arrangement since the conduit is protected to some extent by the boards. In Figure 11 the conduit is shown as it would appear when squeezed into a cylindrical member 23, such as a steel conduit which would be required when passing through floors or walls. In Figure 12 is shown a portion of conduit bent at right angles, one or more notches 24 being cut in the rear surface 2 of the conduit to facilitate bending. In Figure 13 is shown two adjoining sections of the conduit having the ends of their respective conductors insulated from one another by caps 16 and connected by plugs 9 and cables 26 to a switch 27 of any ordinary type.

While I have herein described and shown a preferred embodiment of my invention, it will be readily understood by those skilled in the art that the same may be modified in various ways to meet any particular or peculiar requirement, without departing from the spirit of my invention.

Having thus described my said invention, what I claim and desire to secure by Letters Patent of the United States is:

An apparatus of the character described comprising a body of flexible insulating material having a base portion, a central portion integral therewith, a pair of side members also integral therewith arranged in spaced relation to said central portion and terminating in opposed flanges projecting beyond and overhanging said central portion, a pair of conductors embedded in said body and projecting into the spaces between said central portion and said side members, and an attachment plug having a pair of longitudinal prongs adapted to engage said conductors when positioned within said spaces, the extremities of said flanges being normally separated by a space substantially equal to the width of said prongs whereby said prongs may be first inserted in alignment with said spaces and then turned through 90 degrees to expand said flanges and to permit the placing of said prongs in contact with said conductors.

FRANK KINDBERG.